Sept. 10, 1968   SHIH-MING HO   3,401,278
ELECTRODES FOR MAGNETOHYDRODYNAMIC DEVICES
Filed July 6, 1965
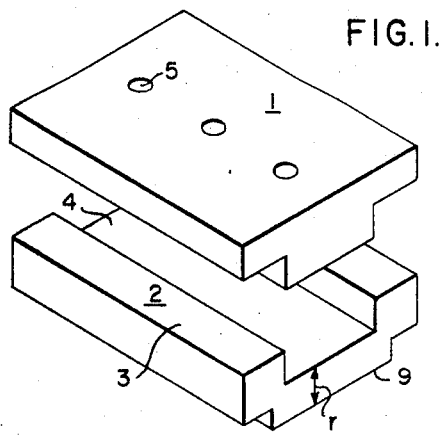
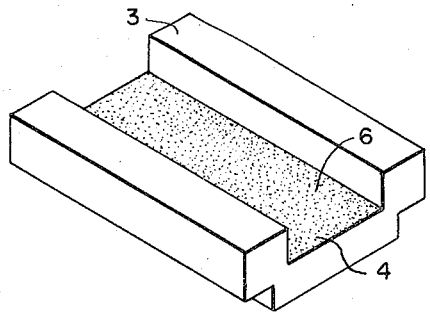
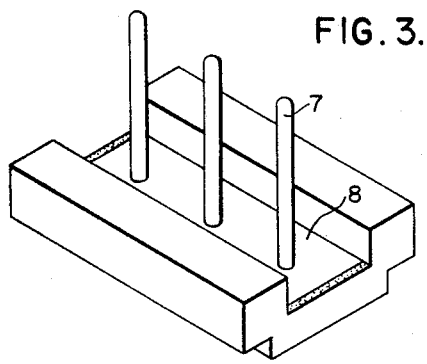
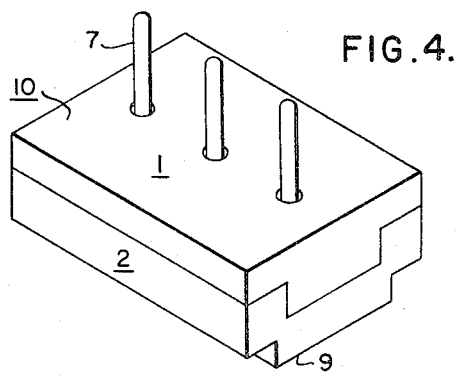
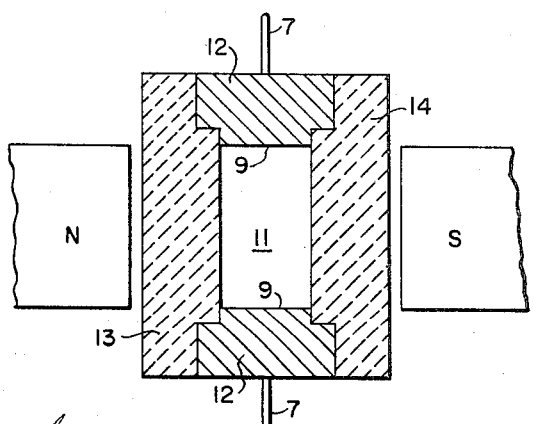
INVENTOR.
Shih-Ming Ho United States Patent Office 3,401,278
Patented Sept. 10, 1968

3,401,278
ELECTRODES FOR MAGNETOHYDRODYNAMIC DEVICES
Shih-Ming Ho, Pittsburgh, Pa., assignor to Westinghouse Electric Corporation, Pittsburgh, Pa., a corporation of Pennsylvania
Filed July 6, 1965, Ser. No. 469,668
12 Claims. (Cl. 310—11)

The present invention relates to high temperature electrode structures, and more particularly to electrode structures for current collection in magnetohydrodynamic accelerators and generators.

The conventional process of generating electrical power comprises moving metal conductors through a magnetic field. Generally, the energy conversion is from heat to mechanical energy to electrical energy. Electrical energy can also be generated by moving fluid conductors in a magnetic field. By such means thermal energy is directly converted into electrical energy. Such generating means are now commonly known as magnetohydrodynamic generators usually abbreviated MHD. An MHD generator uses a thermally ionized working fluid, usually a combustion gas which is seeded with an alkali metal to increase gas conductivity. The ionized gas is then passed through a transverse magnetic field. Current collecting electrodes are placed along the flow of ionized gas to collect the electrical current generated by movement of the electrically conducting gas in the magnetic field.

The general theory and operation of a magnetohydrodynamic (MHD) generator is described in U.S. Patent 3,275,860, issued Sept. 27, 1966 to Stuart Way and assigned to the same assignee as the present invention. As disclosed in the patent, in order to obtain an efficient cycle of operation it is necessary that thermally ionized gas be maintained at a highly conductive state, thus the gas must be kept at a high temperature of the order of 2500° C. Using combustion product gases which contain an appreciable fraction of oxygen, perhaps 5% as well as carbon dioxide and water, due to dissociation, gives rise to the problem of electrode durability. This problem is present because most materials which are electrical conductors and are able to stand high temperatures of 2200 to 2760° C. are also oxidizable. In other words, a major problem in MHD devices is the selection of refractory electrode materials that can withstand the attack of the various oxidizing species present at very high temperatures in the generator.

Additionally, the hot gas stream flows through MHD devices at extremely high velocities, in the order of 3000 feet per second. Such high velocities in combination with the high temperatures encountered in MHD devices result in rapid and extensive erosion of the electrode surfaces. There has been found no metal carbide or boride which can withstand extended exposure to both the high temperature and the atmosphere of the MHD combustion gas products as well as the extreme velocities of the gas stream. However, it is known that of the common refractory oxides only zirconia has the necessary properties to withstand the velocity, temperature and atmosphere and also function as an electrical conductor. Zirconia, however, has a low coefficient of thermal conductivity. The temperature within the material away from the hot surface drops so rapidly that its electrical conductivity is drastically reduced from its high temperature-conductivity value.

In accordance with the present invention, an electrical conductor, made of a suitable metal, is disposed in a zirconia electrode as close as possible to the surface exposed to the hot working fluid without penetrating the surface. The conductor extends through the zirconia electrode to the opposite (cold) surface thereof for purposes of external circuit connections.

It is therefore an object of the present invention to provide a new and improved electrode structure for use in MHD thermal to electrical energy conversion apparatus.

It is a further object of the present invention to provide a new and improved electrode structure that can withstand the high temperatures in an MHD device and the oxidizing processes inherent in such devices.

It is still a further object of the present invention to overcome the inherent conductivity drop off in a zirconia electrode away from its hot current collecting surface.

Yet another object of the invention is to provide an efficient method of making such electrodes.

Broadly, the present invention provides a design and fabrication method for the preparation of composite ceramic-metal electrodes. Such an electrode consists of a pair of zirconia blocks or bricks with a metal insert disposed in the brick but not exposed to the hot surface of the brick or to the hot gas stream flowing in an MHD device. The metal insert conducts the current to the cool side where it is directly delivered to an external circuit. The heat loss due to the metal parts is minimal and the external connections to load circuits is much simpler and more efficient than that to graphite or other types of electrodes. Appropriate metals for the insert would be platinum, iridium, palladium and rhodium. These metals are very resistant to heat and acids, and to chemical reaction in general. Platinum is particularly suited for the MHD environment and for the zirconia electrode since it has a relatively high melting point, is non-reactive (good oxidation resistance) and wets zirconia very well.

The objects of the invention will become more apparent when considered with the following specification and drawings, in which:

FIGURES 1 through 4 are perspective views of an electrode embodying the invention with the figures additionally showing the order of the steps for the manufacture of the invention;

FIG. 4 additionally shows the completed electrode; and

FIG. 5 is a diagrammatic cross sectional view of a typical MHD generator.

FIGURE 1 shows a body of refractory material, preferably zirconia, which may be cut and ground into separate sections, and which may take the form of male and female sections, as shown, though the invention is not limited thereto. Numeral 1 denotes the male section and numeral 2 denotes the female section. Secondly, the inside bottom surface of the female section 2 is painted or coated with suitable metal paste 6 such as a platinum paste and then heated to 1000° C. for about one hour to produce a well adhering metallic coating on the brick. Thirdly, a second layer of the metal paste (not shown) is painted on the coating and a set of metal inserts, which may consist of three platinum conductors 7, are fused on a piece of metal foil 8, such as platinum, and placed on the new paste layer. Next a thin layer of zirconia cement is applied to the shoulders of the female section and then the male piece is fitted into the female piece over the platinum conductors so the shoulders of the male piece and the female section contact each other. This whole assembly 12 is then fired under pressure at approximately 1500° C. for about two hours to make a good contact between the metal coating and the metal foil.

In the figures, the hot, working surface of the electrode 12 is indicated by numeral 9, and the distance between said surface and the inside bottom surface 4 of electrode section 2 is indicated by $r$ in FIG. 1. The cold surface of the electrode 12 is labelled 10 in FIG. 4.

The distance $r$ between the platinum coating 6 on inside surface 4 and hot surface 9, as shown in FIG. 1, is critical to the overall efficiency of the electrodes. The ideal position of the platinum would be that at which its temperature is around 1700° C., since this temperature is not only below the melting point of platinum but also high enough so that the zirconia body is still a good electrical conductor. Thus, the optimum value of $r$ is a function of the temperature of the hot gas stream in the duct, the cooling system employed, and, of course, the thermal conductivity of zirconia.

By way of example, electrode structures may be fabricated using a value of ⅜ of an inch for $r$ based on their thicknesses, and extrapolation from major temperature measurements, i.e., 2200° C. at the hot surface 9 and 540° C. at the cold surface 10, which implies that 1700° C. occurs at a distance of about ⅜ of an inch from the hot surface. Obviously, distance $r$ would fluctuate depending upon local parameters and conditions within a particular MHD system.

FIG. 5 illustrates a conventional MHD generator arrangement having an elongated rectangular fluid passage or duct 11 extending into the plane of the paper. The novel electrodes 12 are disposed in duct 11 so that the hot working surfaces 9 are exposed to the thermally ionized fluid flowing in duct 11, and are connected to a load circuit (not shown) via conductors 7 extending perpendicularly from electrodes 12. Refractory wall portions 13 and 14 may be used to support the electrodes and to form duct 11 in conjunction with the electrode structures. The duct is disposed between pole pieces of a suitable magnet to provide a transverse magnetic field in the duct and to the flow of the working fluid. Thus, as an electrically conducting working fluid passes through duct 11 and the transverse magnetic field a current is generated which is collected by electrodes 12.

It should now be apparent from the above description that a novel electrode has been disclosed that is particularly useful in MHD devices. The two layer body of zirconia material with heat and corrosive resistant metal inserts and conductors provides a durable electrode surface with excellent electrical current conducting qualities that makes it well suited for high temperature, corrosive, erosive environments such as encountered in MHD generators. Long lasting electrodes, in turn, reduce repair, maintenance and generator shut-down costs.

Although the present invention has been described with a certain degree of particularity, it should be understood that the present disclosure has been made only by way of example and that numerous changes and details of construction may be resorted to without departing from the scope and spirit of the invention. For example, male and female sections 1 and 2 respectively, are given only for purposes of illustration. Sections 1 and 2 may take any suitable form and shape for conveniently securing the metal insert therebetween. Thus, the invention is not limited to the specific arrangement shown and described, but is intended to include all modifications which fall within the spirit and scope of the invention.

I claim as my invention:

1. An electrode for an energy conversion apparatus operative with a flow of thermally ionized working fluid comprising a refractory oxide block of material divided into two sections with the inside face of one section having a coat of metal bonding material, a metal foil placed on said bonding material, electrical conductors secured to said foil and extending through the second section of the divided block, the metal of the bonding material, foil and conductors selected from the group consisting of iridium, rhodium, palladium and platinum.

2. The electrode of claim 1 in which the refractory oxide block is made of zirconia.

3. An electrode for an energy conversion apparatus operative with a flow of thermally ionized working fluid comprising a refractory oxide body divided into male and female sections, the inside surface of the female section coated with a metal bonding material, a metal foil placed on said material, electrical conductors secured to said foil and extending through the male section of the divided body, the metal of the material, foil and conductors selected from the group consisting of iridium, platinum, rhodium and palladium.

4. The electrode of claim 3 in which a coat of refractory bonding material is disposed on the shoulders of the female section for contact with the shoulders of the male section.

5. An electrode structure for an energy conversion apparatus operative with a flow of thermally ionized fluid comprising a refractory oxide brick containing a layer of metal foil selected from the group consisting of rhodium, palladium, platinum and iridium, electrical current conducting means secured to said foil and extending through the body of the brick to the outside thereof, the oxide brick having a hot working surface adjacent the ionized fluid with the layer of metal foil spaced from the hot working surface to the extent that the metal foil is below its melting temperature but above the temperaure at which the refractory oxide functions as an electrical conductor.

6. An electrode structure for an energy conversion apparatus operative with a flow of thermally ionized fluid comprising a body of zirconia material containing a layer of platinum foil, means for conducting electrical current secured to said foil and extending through the zirconia body to the outside thereof, the zirconia body having a hot working surface adjacent the ionized fluid with the layer of foil spaced from the hot working surface to the extent that its temperature is of the order of 1700° C.

7. A thermal to electrical energy conversion apparatus having a duct means for flow of hot ionized gas therethrough, at least one electrically conducting electrode means disposed in the duct, said electrode means comprising a refractory oxide brick containing a layer of metal foil selected from the group consisting of rhodium, palladium, platinum and iridium, electrical current conducting means secured to said foil and extending through the bricks to the outside thereof, the oxide brick having a hot working surface adjacent the hot ionized gas flow in the duct, the layer of metal foil spaced from the hot working surface in the brick to the extent that the foil is below its melting temperature but above the temperature at which the refractory oxide functions as an electrical conductor.

8. A thermal to electrical energy conversion apparatus having a duct means for flow of a hot ionized gas therethrough, at least one electrode means disposed in the duct, said electrode comprising a refractory oxide block of material divided into two sections with the inside face of one section having a coat of metal bonding material, a metal foil disposed on said bonding material, electrical conductors secured to said foil and extending through the second section of the divided block, the metal of the bonding material, foil and conductors selected from the group consisting of rhodium, iridium, palladium and platinum.

9. A method of making an electrode for an energy conversion apparatus operative with a thermally ionized fluid comprising the steps of dividing a refractory oxide brick into two sections, coating the inside surface of one section with a metal paste, placing on said paste a metal foil with electrical conductors secured to the foil coating the edges of one of the sections with a refractory paste, placing the two sections together with their surfaces contacting the paste and foil, and firing the entire assembly under pressure.

10. A method of making an electrode for a magnetohydrodynamic device comprising the steps of cutting and grinding a zirconia block into male and female sections, coating the inside bottom surface of the female section with platinum paste, placing a platinum foil with electrical conductors on the paste, coating the shoulders of the female section with a zirconia cement, fitting the male section over the electrical conductors and into the female section, and firing under pressure the complete assembly.

11. The method of claim 9 including the additional step of heating the painted section prior to the step of placing the foil thereon.

12. The method of claim 11 including the step of applying a second coating of metal paste on the first coating after the heating step.

References Cited

UNITED STATES PATENTS 3,149,253 9/1964 Luebke _____ 310—11
3,165,652 1/1965 Prater _____ 310—11

MILTON O. HIRSHFIELD, *Primary Examiner.*

D. X. SLINEY, *Assistant Examiner.*